March 22, 1927.                                       1,621,994
             J. L. MORRIS ET AL
             SAUSAGE TWISTING MACHINE
                Filed Aug. 9, 1926          5 Sheets-Sheet 2
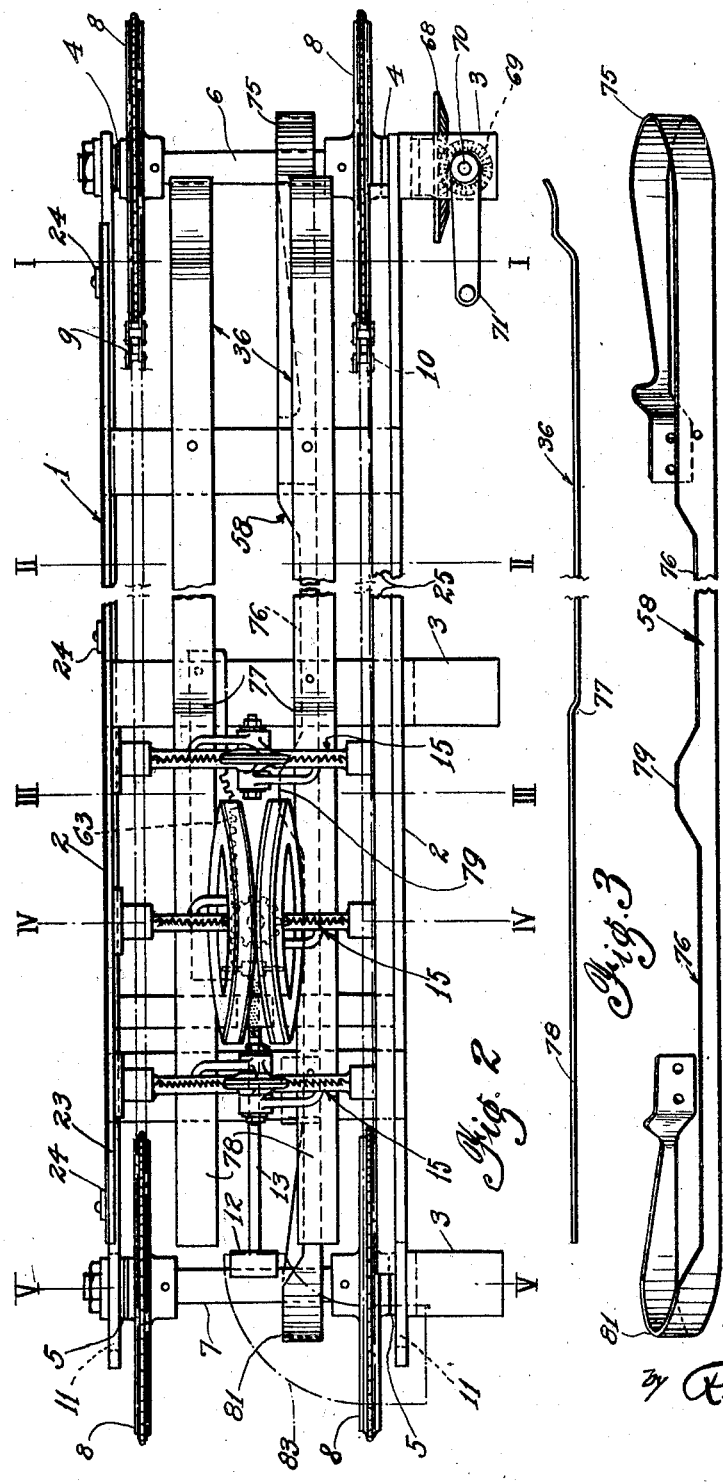
Inventors:
Jolly L. Morris,
Charles H. Allen.

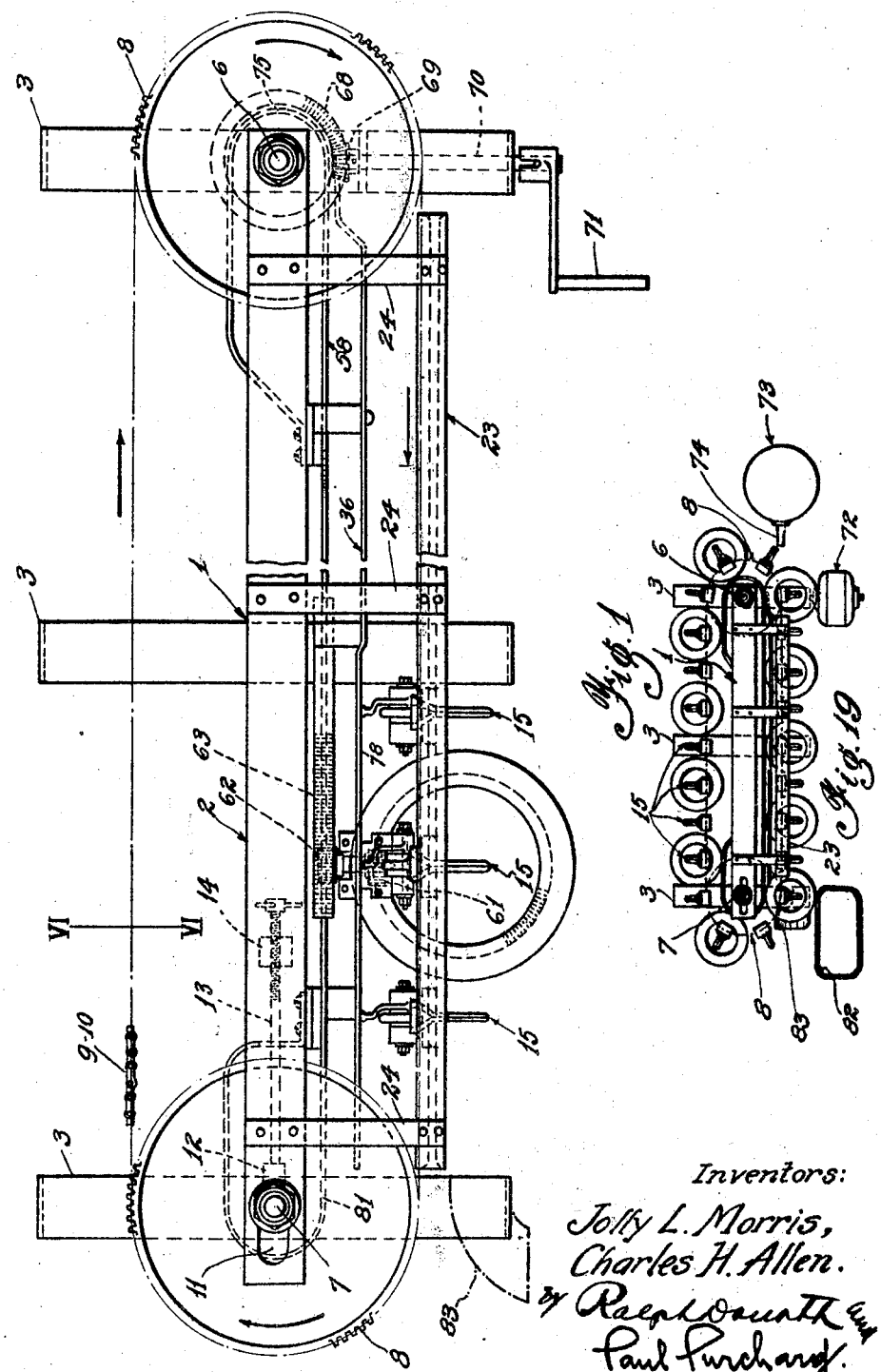

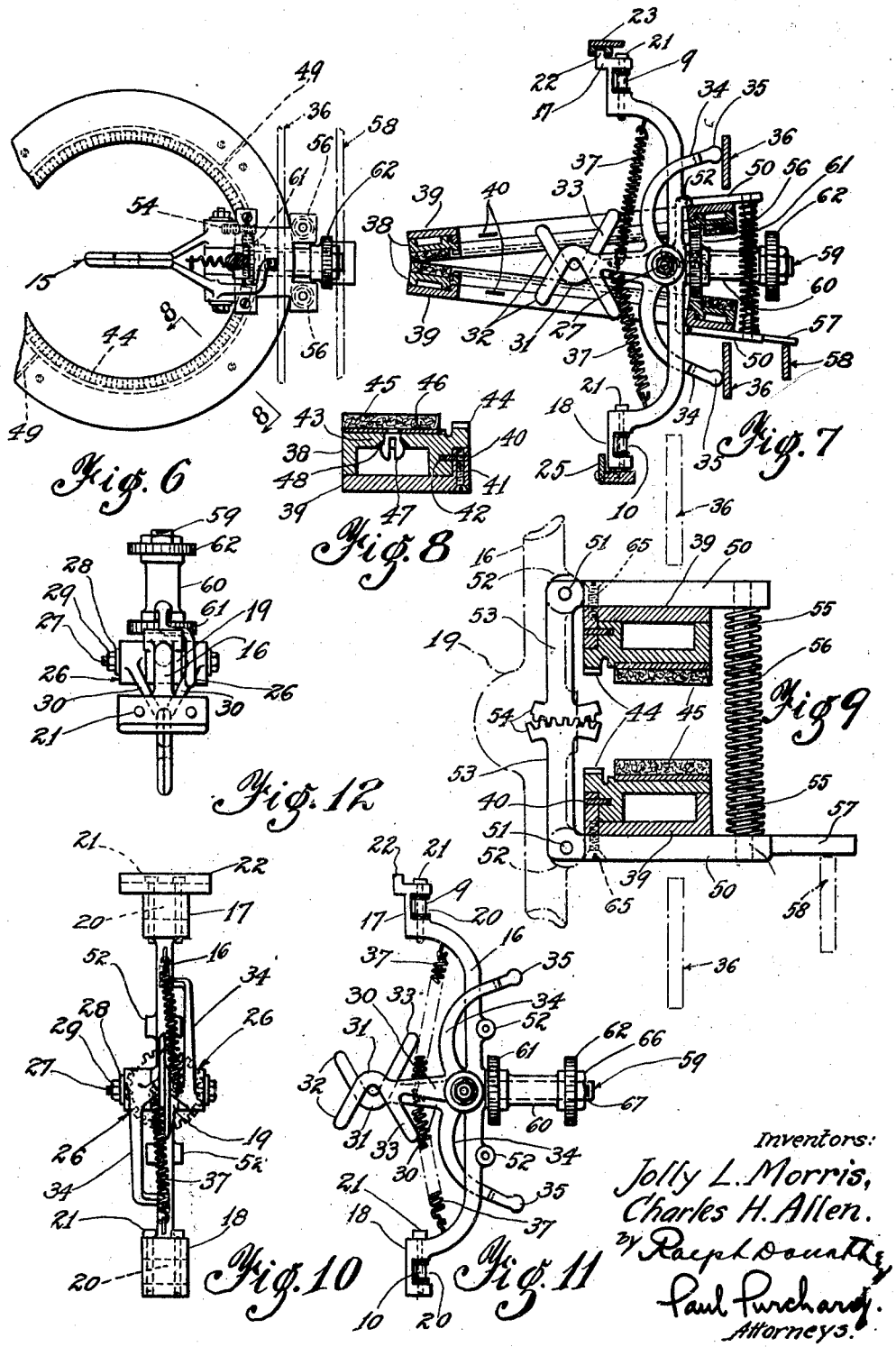

Inventors:
Jolly L. Morris,
Charles H. Allen.
by Ralph Oauth
Paul Purchard.
Attorneys.

March 22, 1927. 1,621,994
J. L. MORRIS ET AL
SAUSAGE TWISTING MACHINE
Filed Aug. 9, 1926   5 Sheets-Sheet 5

Inventors:
Jolly L. Morris,
Charles H. Allen.

Patented Mar. 22, 1927.

1,621,994

UNITED STATES PATENT OFFICE.

JOLLY L. MORRIS, OF CRAFTON, AND CHARLES H. ALLEN, OF PITTSBURGH, PENNSYLVANIA, ASSIGNORS OF ONE-HALF TO WILLIAM F. FRIED, RICHARD H. FRIED, AND EDWARD B. FRIED, ALL OF PITTSBURGH, PENNSYLVANIA.

SAUSAGE-TWISTING MACHINE.

Application filed August 9, 1926. Serial No. 127,996.

This invention relates to sausage twisting or linking machines.

The primary object of this invention is to provide a machine for automatically dividing a filled sausage-casing into sausages of a specified length and in tying said individual sausages by means of the twisting process used nowadays on most types of smaller sausages, such as the so-called wieners, frankfurters, pork-sausage and so forth. Another object of this invention is the provision of a machine which is adapted to operate on the finest kinds of sausage-casings without injuring them and which is adapted to do the work of several persons with greater uniformity and perfection. Another object is to provide an automatic sausage linking machine which is relatively simple in construction, very sanitary in so far that it reduces the handling of such goods by human hands to a very great extent, and which affords a very great saving of floor-space as compared with the present method of twisting sausages by several persons working side by side on a table of considerable length. Additional features and advantages of this invention will appear from the following description considered in connection with the accompanying drawings forming part of this application and in which:

Fig. 1 is a top plan view of the preferred embodiment of the machine and in which only one set of sausage clamping and twisting elements has been shown.

Fig. 2 is a front elevation of Fig. 1.

Fig. 3 is a top plan view of one of two similar clamp-guide-rails used in the machine.

Fig. 4 is a perspective view of a cam-rail embodied in the invention.

Fig. 5 is a side elevation of a short rack-member, the purpose of which will be explained later.

Fig. 6 is a fractional plan-view, on an enlarged scale, of one of the sausage twisting elements.

Fig. 7 is a side elevation, partly in section, of said sausage twisting element with associated cooperative parts.

Fig. 8 is a cross-section showing the construction of one of the two similar rings forming part of a twisting element, said section being taken on line 8—8 in Fig. 6.

Fig. 9 is a fractional side elevation, partly in section, showing one method of hingedly connecting together the two rings of a twisting element.

Fig. 10 is a front elevation showing one set of sausage clamping fingers.

Fig. 11 is a side elevation of Fig. 10.

Fig. 12 is a top plan view of Fig. 10.

Figure 13:
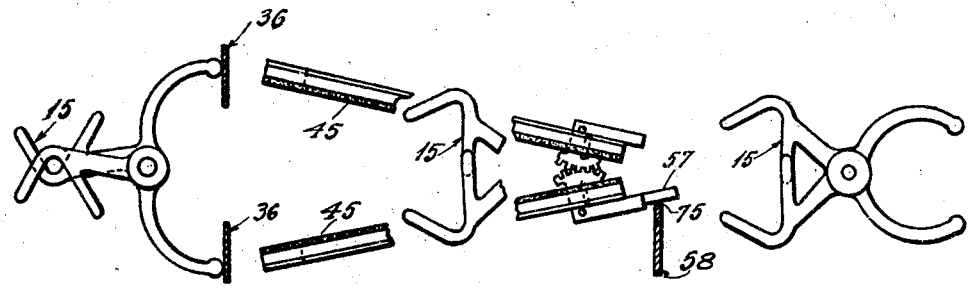

Figs. 13 to 18 inclusive are diagrammatic views showing the condition of the sausage twisting elements and clamping fingers at various positions of their travel on the machine.

Fig. 19 is a plan-view showing on a reduced scale a complete sausage stuffing and linking plant provided with one of our machines.

Referring to the drawings, our machine comprises a supporting frame 1 consisting of two spaced parallel and superimposed horizontal plane structures 2 secured together by and mounted on standards 3. Mounted for rotation in suitable bearings 4 and 5 are the vertical shafts 6 and 7 upon which are keyed or otherwise secured two pairs of identical chain-sprockets 8, which are engaged by the horizontally movable endless chains 9 and 10, disposed in the manner shown in the drawings.

In order to maintain the proper tension in these parallel chains, the bearings 5 of the rear shaft 7 are preferably slidably mounted in slots 11 provided in the upper and lower plane structures 2, and the shaft 7 is acted upon by a tightening device of any desired type, such as the one shown in Figs. 1 and 2 as consisting of a shaft engaging shoe 12 which may be moved either way by means of a threaded rod 13 mounted in the threaded block 14 suitably positioned and secured on the supporting frame.

Mounted on said parallel chains are the vertically disposed clamping elements indicated in a general manner by the numeral 15. The spacing of these fingers varies on each machine to suit the length of the sausage-links which are to be formed and twisted thereon.

Reference being had especially to Figs. 10 and 11, it will be seen that each clamping element comprises a vertical bracket 16 having an upper head 17, a lower head 18 and an intermediate hub 19. Each head is cut out, as at 20, to provide room for the endless chains 9 and 10 and is provided with a pair of suitably spaced pins 21 whereby both ends of the bracket are secured to said chains. The upper head is also furnished with an extension 22 which is adapted to fit within the upper chain guide 23, the latter being secured in proper position and alignment on the frame by means of the braces 24. The lower head is also guided and longitudinally supported, to prevent sagging, by means of the L-shaped lower chain-guide 25 mounted and secured on the feet of the frame.

The two sausage clamping fingers 26 are mounted for opposite rocking movement on each bracket by means of a bolt 27 which fits a suitable aperture drilled through the central hub 19. Suitable washers 28 and a nut 29 are also provided on said bolt.

Both clamping fingers 26 are identical in shape and size and have substantially the shape of a bell-crank-lever having a forward arm 30 provided with a V-shaped squeezer 31 the front leg 32 of which is shorter than the rear leg 33, for a purpose to be stated later. The rear arm 34 of each lever is slightly curved and terminates with a rounded enlargement 35 which is normally forced against its corresponding clamp-guide-rail 36 by the action of a spring 37 having one end attached to the bracket 16 and the other end to the forward arm 30. The clamping fingers are mounted on the bracket in reversed relation so that when the rear arms 34 are forced to the front (owing to the form of the guide-rails), the V-shaped squeezers 31 will close up. On the other hand, when the arms 34 leave said guide-rails, the action of the springs 37 will cause the squeezers to open up to the full extent. As shown in the drawings, the squeezers have their inner faces suitably ground flat, to slide easily against each other.

The twisting of each individual sausage-link is performed in our invention by inserting said link between two surfaces moving in opposite directions and frictionally engaging said link so that the latter will be revolved. Such rotative movement may be imparted to a sausage-link by means of two oppositely movable reciprocable surfaces, but in the present embodiment the simultaneous rotation of two adjacent sausage-links is obtained by the annular shaped revolving twisting-discs shown in the drawings.

By referring especially to Figs. 6 to 9, it will be noted that each twisting element is composed of an inner ring 38 rotatably mounted in an outer and non-rotatable ring 39 and secured thereon by means of short retaining plates 40 inserted in the inner rim 41 of the non-rotatable ring 39 and adapted to engage an endless peripheral groove 42 cut in the rotatable ring. The latter comprises a flat portion 43 and a toothed inner rim 44. In the present embodiment, the sausage engaging portion of the twisting-rings is formed of a contact-ring 45 made of felt, or other suitable material, which is glued upon a flat sheet metal ring 46 removably secured to the rotatable ring by means of the snap-pins 47 riveted to the ring 46 and adapted for snap engaging with suitable apertures 48 drilled in the movable ring. The purpose of removably securing the contact-rings is to enable the periodical cleaning or boiling out of the latter to keep them free of grease and in a sanitary condition. Moreover, in order to facilitate the removal of said contact-rings without taking portions of the machine apart, they are preferably made in two or more segments, as indicated by the dividing lines 49.

The upper and lower twisting-rings are connected together for jaw-like hinged movement in the manner best shown in Fig. 9. It will be noted therein that a plate 50 is secured by means of screws 65 to the inner side of each of the non-rotatable rings 39 and rockably mounted on pins 51 held in bosses 52 suitably placed on the bracket 16. Connected to the plates 50 are the arms 53 provided with the meshing gear segments 54, concentric with the pins 51. On their projecting rear ends, the plates are provided with dowels 55 which serve to hold in place the compression springs 56, the tendency of which is to force, with moderate force so as not to damage the sausages, the forward end of the twisting-rings together, in the position shown in Fig. 7, for instance. The lower plate 50 is also provided with a protruding guide-finger 57 of sufficient length to bear on the cam-rail 58. If desired, the extension 57 may be provided with a roller (not shown) to reduce the friction on the cam-rail.

At the back of the intermediate hub 19 there is provided a stub-shaft 59 upon which is rotatably mounted a gear hub 60 having two gears 61 and 62, the former being toothed for simultaneous and constant engagement with the toothed rims 44 of both rotatable rings and the latter gear adapted to mesh with a stationary rack-member 63 securely mounted and properly located on the supporting frame. As shown particularly in Fig. 5, this rack has a curved portion 64 to facilitate its initial engagement by the gear 62. The gear hub 60 is held in proper position on the stub-shaft 59 by means of a nut 66 screwed on suitable threads 67 provided on the end of said stub-shaft.

The machine may be operated by hand or, preferably, by power, by means of the following mechanism: At the lower end of the front shaft 6 is mounted a bevel gear 68 which meshes with the gear-pinion 69 fastened at the inner end of the horizontal drive-shaft 70, suitably mounted for rotation in the front standard 3. The outer end of this shaft is provided with a crank 71, for manual operation, or it may be connected to an electric motor 72, as suggested in Fig. 19. The proper sense of rotation is that which causes the chains 9 and 10 and the clamping and twisting elements mounted thereon to travel from right to left, as indicated by arrows in Figs. 1 and 2.

Having described the principal parts of the machine, its operation will be readily understood, reference being had especially to the diagrammatic Figs. 13 to 18 inclusive. These figures refer only to one set of twisting and clamping elements, but the operation of all of the other sets which are evenly distributed on the endless chains 9 and 10 will, of course, be identical. Said operation is as follows:—

The machine having first been set up in proper alignment with the meat stuffer 73, Fig. 19, of any desired and suitable type, the sausage casing to be stuffed is then pushed back on the feed nozzle 74 of said stuffer, and the front end of the casing is tied up by means of a string. Pressure is now applied on the stuffer to force out the sausage meat into the casing, and the twisting machine is operated.

Before the twisting-rings reach the position or station I—I (see Figs. 1 and 2), the fingers of the three clamping elements cooperating with each set of twisting-rings will be spread open because of the fact that the rear arms 34 have not yet come in contact with the clamp-guide-rails 36 which are placed at the front of the twisting-machine and extend a distance slightly shorter than the spacing of the shafts 6 and 7. Also, the guide-finger 57 will bear on the upper edge 75 of the cam-rail 58 so that both twisting-rings will be flared open at the front. At this moment the tied end of the sausage-casing is placed between the squeezers of the clamping-fingers immediately preceding the first set of twisting-rings and the filled casing is laid on the lower twisting-ring and between the squeezers immediately following said rings.

As stated before, the front legs 32 of each set of squeezers 31 are made short and the rear legs 33 are of such length that they will cross each other even when the squeezers are full open; this is done to facilitate the insertion of the stuffed casing between said squeezers and prevent the casing from being pushed accidentally backward out of said squeezers.

When the forwardly moving twisting-ring reaches substantially the position indicated by the line I—I in Figs. 1 and 2, the condition illustrated diagrammatically in Fig. 13 will prevail. Namely, the first set of clamping-fingers will have engaged the forward face of the guide-rails 36 thereby causing the closing up of the V-shaped squeezers 31 on the tied end of the sausage. The latter will, therefore, be pulled by the moving chains 9 and 10 while it rests on the lower of the still open twisting-rings and in the rearward clamping fingers, which are also still open. Upon further movement of the chains, the twisting-rings will still remain open, but the remaining two sets of clamping-fingers will also have engaged the rails 36 and closed on the filled sausage-casing, thus dividing the latter into two links of sausage.

Figure 14:
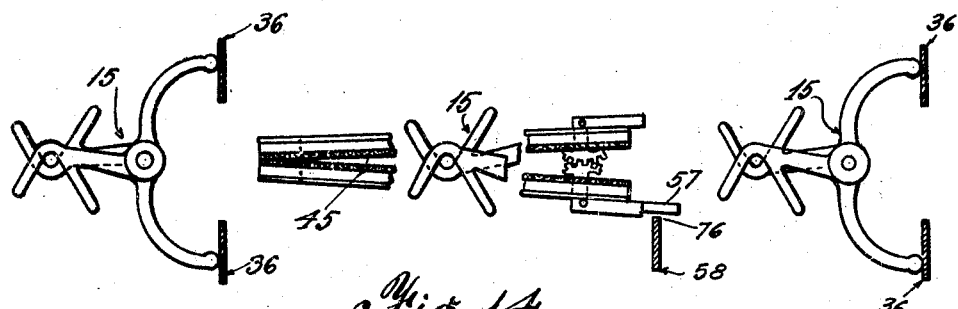

Fig. 14 illustrates the condition arising when the twisting-rings have reached the position or station II—II. In this position the three sets of clamping-fingers are still compressed, because of continued engagement with the rails 36, and the twisting-rings will also close up on the inserted sausage-links and, through the action of the springs 56, exert a moderate pressure thereon on account of the guide-finger 57 having left the upper edge and now traveling over the lower edge 76 of the cam-rail 58.

Figure 15:
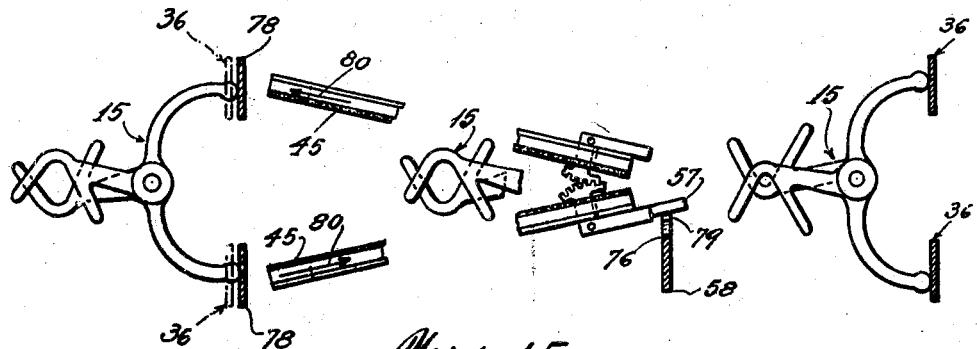

In position III—III, represented in Fig. 15, the first and second sets of clamping-fingers have passed the slight bends 77 and bear on the slightly receding and straight portion 78 of the guide-rails 36 with the result that the squeezers of these two sets of clamping-fingers have opened a certain amount, whereas the last set of fingers still bears on the forward portion of the guide-rails and are, consequently, still fully closed. However the guide-finger 57 has reached the top of the cam-portion 79 which causes the twisting-rings to flare open. At the same time, the rack-gear 62 has engaged the stationary rack 63 with the result that the upper and lower rotatable rings are rotated in opposite directions, as indicated by the arrows 80, in Fig. 15, and the two sausage-links are also twisted in opposite direction owing to the frictional engagement with the lower twisting-ring. The purpose of rotating the sausage links before they are clamped by the twisting-rings is to obtain a smoother operation and prevent the rupture of the casing. The slight opening of the squeezers is to facilitate the displacement of the sausage-meat in the casing which is caused by the twisting of the links.

Figure 16:
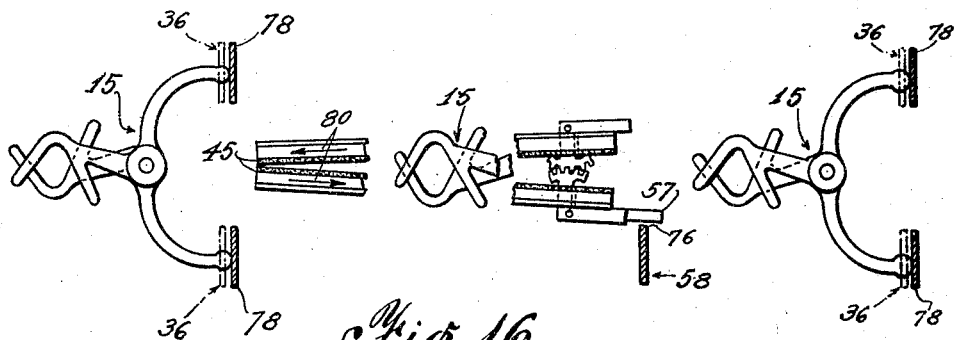

Fig. 16 shows the conditions occurring in the position IV—IV. All the clamping-fingers now engage the receding portions 78 of the guide-rails and are, therefore, slightly opened. However, the guide-finger 57 has left the cam 79 and the twisting-rings have closed upon the sausage-links and exert a moderate pressure thereon. The gear 62 being still in meshing engagement with the rack 63, the twisting-rings keep on rotating thus imparting the required final twisting to the sausage links.

Figure 17:
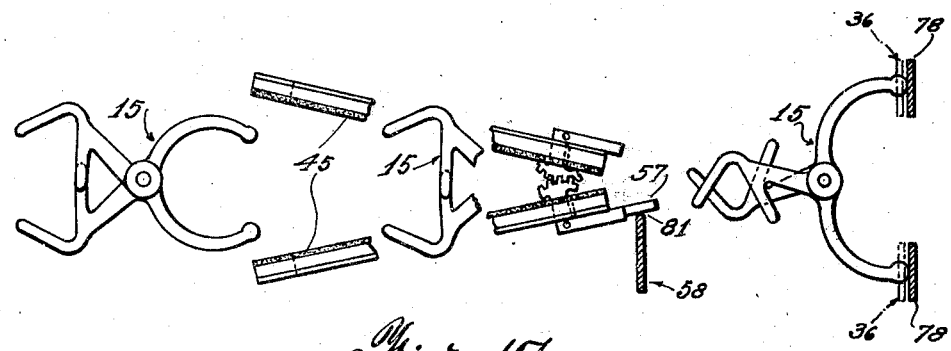

The conditions existing in position V—V are depicted in Fig. 17. The first and second sets of clamping-fingers are now full open because of having left the guide-rails 36, whereas the last set of fingers is still partly closed. The guide-finger has risen on top of the upper edge 81 of the cam-rail and, therefore, the twisting-rings have opened to allow the fully twisted sausage links to drop into a suitably placed container 82, Fig. 19. To properly guide said falling sausage-links, the machine is preferably provided with a curved metal shield 83, having somewhat the shape of a plow-blade, as shown in dot and dash lines in Figs. 1 and 2.

Figure 18:
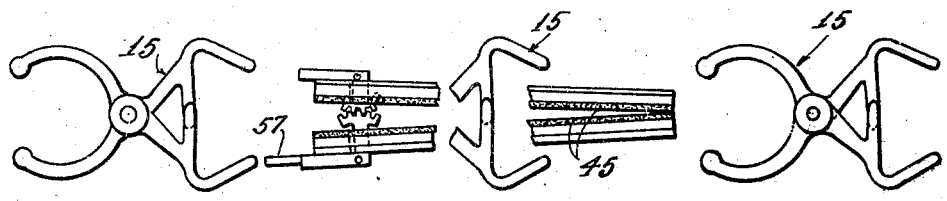

Fig. 18 shows the condition of the various elements under consideration when they have turned around to the rear side of the machine. There being no guide-rails and no cam-rail on this side (in the present embodiment), all clamping-fingers are fully opened and the twisting-rings are closed by the springs 37 and 56 respectively.

As will be readily understood without requiring additional illustration, if desired, the rear side of the machine may also be supplied with guide-rails 36 and a cam-rail 58 disposed in reversed relation to the similar rails in the front of the machine for the purpose of practically making the machine, so to speak, double acting. That is, on each end of the machine there would be at the same time a feeding and a discharging side, thus substantially doubling the capacity of the machine.

The spacing of the clamping and twisting elements on each machine is permanent and corresponds to the standard and specified length of a certain kind of sausage. Yet, with a given type of machine, sausage-links of half the standard length may also be twisted by simply passing a stuffed casing twice through the machine. The first run would, of course, produce sausages of standard length, but at the second run the chain of sausages would be shifted longitudinally an amount equal to one half the distance between two consecutive twists so that each sausage-link would be divided into two halves by the clamping-fingers and the short links properly twisted by the twisting-rings.

It is evident that for proper operation of the machine, the speed of the endless chains 9 and 10 and the amount of meat fed through the nozzle of the stuffer 73 must be well regulated. If, for some reason, such close regulation cannot be obtained, the sausage-casings are first fully stuffed by the stuffing-machine and are then fed individually into the twisting-machine.

While the illustrated and described example constitutes a practical embodiment of our invention, we do not wish to limit ourselves to the mechanical details herein illustrated, since it is obvious that the same can be considerably varied without departing from the spirit and scope of the invention as defined in the appended claims.

We claim:

1. In a sausage twisting machine, a pair of oppositely rotatable superimposed annular planes adapted to receive therebetween two sausage-links and rotate same in opposite directions.

2. In a sausage twisting machine, a plurality of pairs of oppositely rotatable superimposed annular planes each adapted to receive therebetween two sausage-links and rotate same in opposite directions.

3. In a sausage twisting machine, a pair of oppositely rotatable superimposed annular planes adapted to receive therebetween two sausage-links and rotate same in opposite directions and means for rotating said planes.

4. In a sausage twisting machine, a pair of oppositely rotatable superimposed annular planes adapted to receive therebetween two sausage-links and rotate same in opposite direction, and unitary means for rotating said planes in opposite directions.

5. In a sausage twisting machine, a pair of oppositely rotatable superimposed annular planes; guide-rings for said planes; means for hingedly connecting said guide-rings for outward flaring movement and unitary means for simultaneously rotating said annular planes in opposite directions.

6. In a sausage twisting machine, a pair of oppositely rotatable superimposed annular planes; guide-rings for said planes; means for hingedly connecting said guide-rings for outward flaring movement; means to effect said outward flaring movement, and unitary means for simultaneously rotating said annular planes in opposite directions.

7. In a sausage twisting machine, a pair of oppositely rotatable superimposed annular planes; guide-rings for said planes; means for hingedly connecting said guide-rings for outward flaring movement; means to effect said outward flaring movement; unitary means for simultaneously rotating said annular planes in opposite directions, and means for normally holding said guide-rings in closed or unflared position.

8. In a sausage twisting machine, a pair of oppositely rotatable superimposed annular planes; guide-rings for said planes; means for hingedly connecting said guide-rings for outward flaring movement; means to effect said outward flaring movement; unitary means for simultaneously rotating said annular planes in opposite directions, and resilient means adapted to normally hold said guide-rings in closed or unflared position.

9. In a sausage twisting machine, a plurality of pairs of oppositely rotatable superimposed annular planes adapted to engage therebetween a filled sausage-casing; means for dividing said casing into links, and, means for actuating said rotatable planes to impart a rotating motion to the links engaged therebetween.

10. In a sausage twisting machine, a plurality of pairs of oppositely rotatable superimposed annular planes adapted to engage therebetween a filled sausage-casing; clamping means positioned centrally of and intermediate said annular planes and adapted to divide said casing into links; means to clamp said clamping means on said casing, and means for actuating said rotatable planes to impart a rotating motion to the links engaged therebetween.

11. In a sausage twisting machine, a frame-structure; a pair of shafts rotatably mounted thereon; chain-sprockets positioned on said shafts; endless chains trained about said sprockets; a plurality of pairs of oppositely rotatable superimposed annular planes carried by said chains and severally adapted to receive therebetween a pair of sausage-links and rotate same in opposite directions; means to rotate said shafts, and means to rotate said planes while traveling with said chains.

12. In a sausage twisting machine, a frame-structure; a pair of shafts rotatably mounted thereon; chain-sprockets positioned on said shafts; endless chains trained about said sprockets; a plurality of pairs of rotatable superimposed hingedly connected annular planes positioned equidistantly on and carried by said chains and severally adapted to receive therebetween a filled sausage-casing; clamping means positioned centrally of and intermediate said planes and carried by said chains adapted to divide said casing into sausage-links; means to clamp said clamping means on said casing; means to rotate said planes while traveling with said chains, and means to rotate said shafts.

13. In a sausage twisting machine, a frame-structure; a pair of shafts rotatably mounted thereon in parallel relation; a pair of identical chain-sprockets positioned in spaced relation on each shaft; a pair of parallel endless chains trained about said sprockets; a plurality of pairs of oppositely rotatable superimposed annular planes severally adapted to engage therebetween a filled sausage-casing; guide-rings for said planes; supporting means for said guide-rings secured to said chains for travel therewith; means for hingedly connecting said guide-rings for outward flaring movement; clamping means carried by said chains positioned centrally of and intermediate said annular planes adapted to divide said casing into sausage-links; means to clamp the clamping means on said casing; unitary means to rotate the annular planes while same are traveling with said chains; means to effect the outward flaring movement of the annular planes and guide-rings, and means for rotating said shafts.

14. In a sausage twisting machine, a frame-structure; a pair of shafts rotatably mounted thereon; a pair of identical chain-sprockets mounted on each shaft; a pair of endless chains each encircling a pair of chain-sprockets; a plurality of pairs of annular planes adapted to hold a filled sausage-casing therebetween; a plurality of clamping elements mounted on the chains adapted to divide said sausage-casing into links; a cam-rail carried by the frame-structure adapted to open and close the annular planes when the latter are properly operated; a pair of guide-rails positioned on the frame structure adapted to actuate the clamping elements, and a rack on the frame-structure for rotating the aforesaid planes.

15. In a sausage twisting machine, a sausage twisting mechanism comprising a pair of superimposed annular planes adapted to receive therebetween a pair of sausage-links; guide-rings for said planes; means for hingedly connecting said guide-rings, and means for rotating said annular planes within said guide-rings for the purpose of twisting said sausage-links.

16. In a sausage twisting machine, a sausage twisting mechanism comprising a pair of superimposed annular planes adapted to receive therebetween a pair of sausage-links; guide-rings for said planes; a bracket for said guide-rings; means for hingedly connecting the guide-rings to said bracket; a toothed rim positioned on each annular plane; a stub-shaft secured on said bracket; a hub rotatably mounted on said shaft and having a gear in permanent engagement with said toothed rims; a stationary rack member positioned on the frame-structure of said machine, and a second gear mounted on said hub and adapted to engage said rack for the purpose of rotating said annular planes within said guide-rings to twist said sausage-links in opposite directions.

17. In a sausage twisting machine, a sausage twisting mechanism comprising a pair of superimposed annular planes adapted to receive therebetween a pair of sausage-links; guide-rings for said planes; a guide-finger positioned on one guide-ring; a bracket for said guide-rings; means for hingedly connecting the guide-rings to said bracket; a toothed rim positioned on each annular plane; a stub-shaft secured on said bracket; a hub rotatably mounted on said shaft and having a gear in permanent engagement with said toothed rims; a stationary rack member positioned on the frame-structure of said machine; a second gear mounted on said hub and adapted to engage said rack for the purpose of rotating said annular planes within said guide-rings to twist said sausage-links in opposite directions and a stationary cam-rail secured on the frame-structure having raised portions adapted to be engaged by said guide-finger to effect the outward flaring movement of said guide-rings and annular planes.

18. In a sausage twisting machine, a sausage twisting mechanism comprising a pair of superimposed annular planes adapted to receive therebetween a pair of sausage-links; guide-rings for said planes; a guide-finger positioned on one guide-ring; a bracket for said guide-rings; means for hingedly connecting the guide-rings to said bracket; a toothed rim positioned on each annular plane; a stub-shaft secured to said bracket; a hub rotatably mounted on said shaft and having a gear in permanent engagement with said toothed rims; a stationary rack member positioned on the frame-structure of said machine; a second gear mounted on said hub and adapted to engage said rack for the purpose of rotating said annular planes within said guide-rings to twist said sausage-links in opposite directions, a stationary cam-rail secured on the frame-structure having raised portions adapted to be engaged by said guide-finger to effect the outward flaring movement of said guide-rings and annular planes, and means for normally holding said annular planes in closed or forwardly converging position.

19. In a sausage twisting machine, a sausage twisting mechanism comprising a pair of superimposed annular planes adapted to receive therebetween a pair of sausage-links; guide-rings for said planes; a guide finger positioned on one guide-ring; a bracket for said guide-rings; means for hingedly connecting the guide-rings to said bracket; a toothed rim positioned on each annular plane; a stub-shaft secured to said bracket; a hub rotatably mounted on said shaft and having a gear in permanent engagement with said toothed rims; a stationary rack member positioned on the frame-structure of said machine; a second gear mounted on said hub and adapted to engage said rack for the purpose of rotating said annular planes within said guide-rings to twist said sausage-links in opposite directions; a stationary cam-rail secured on the frame-structure having raised portions adapted to be engaged by said guide-finger to effect the outward flaring movement of said guide-rings and annular planes, and resilient means for normally holding said annular planes in closed or forwardly converging position.

In testimony whereof we affix our signatures.

JOLLY L. MORRIS.
CHARLES H. ALLEN.